United States Patent [19]

Wirth

[11] 4,385,895
[45] May 31, 1983

[54] FLEXIBLE COUPLING WITH QUADRILATERAL FLEX FRAMES

[75] Inventor: Charles J. Wirth, West Granby, Conn.

[73] Assignee: Kamatics Corporation, Bloomfield, Conn.

[21] Appl. No.: 207,683

[22] Filed: Nov. 17, 1980

[51] Int. Cl.³ ............................................. F16D 3/60
[52] U.S. Cl. ...................................... 464/69; 464/84; 464/99
[58] Field of Search ..................... 64/12, 17, 19, 31; 464/69, 77, 81, 84, 99

[56] References Cited

U.S. PATENT DOCUMENTS

| | | | |
|---|---|---|---|
| 2,630,692 | 3/1953 | Naugler | 64/12 |
| 3,004,409 | 10/1961 | Grey | 64/12 |
| 3,481,158 | 12/1969 | Mayerjak | 64/12 |
| 3,521,465 | 7/1970 | Bossler, Jr. | 64/12 |
| 3,592,021 | 7/1971 | Mayerjak | 64/12 |
| 3,685,314 | 8/1972 | Flannelly | 64/12 |
| 4,207,758 | 1/1980 | Stone | 64/12 |

FOREIGN PATENT DOCUMENTS 2725289 12/1978 Fed. Rep. of Germany ......... 64/12

Primary Examiner—John Petrakes
Attorney, Agent, or Firm—McCormick, Paulding & Huber

[57] ABSTRACT

A flexible coupling for drivingly connecting driving and driven members and for accommodating both angular and endwise misalignment of such members comprises a plurality of quadrilateral flex frames arranged face-to-face along the central axis of the coupling. The two end frames are connected respectively to the driving and driven members through opposite corner portions of each such frame. Among the flex frames themselves, each frame is connected to the next adjacent frame by having two of its opposite corner portions rigidly connected to two opposite corner portions of the adjacent frame. The joint between each pair of connected corner portions is of an improved construction which maximizes the flexing length of the flex frame legs and otherwise provides benefits resulting in the coupling having improved performance and reliability, particularly with regard to applications requiring the transmission of high levels of torque at high rotational speeds and with possibly high amounts of angular and endwise misalignment.

17 Claims, 3 Drawing Figures

FLEXIBLE COUPLING WITH QUADRILATERAL FLEX FRAMES

BACKGROUND OF THE INVENTION

This invention relates to flexible couplings for joining two rotatable shafts or other rotating parts which may have their rotation axes endwise or axially misaligned, and deals more particularly with such a coupling which can accommodate a substantial amount of angular and endwise misalignment while transmitting relatively high amounts of torque at relatively high speeds within a relatively small space envelope.

This invention further relates to improvements in the type of coupling shown generally by U.S. Pat. No. 3,481,158; No. 3,521,465; and No. 3,592,021.

In a coupling as shown by these prior patents a number of square, rectangular or other quadrilateral flex members, hereinafter referred to as flex frames, are positioned face-to-face along the central axis of the coupling and are joined to one another at opposite corner portions, and the end frames of the series are similarly connected to driving and driven members, to provide a torque transmitting connection between the driving and driven members wherein angular and endwise misalignment is accommodated by bending of the leg portions of the frames. In these couplings, at a joint between two adjacent frame corner portions, the connected corner portions have parallel bearing surfaces which flatly engage one another and which are held tightly to one another by a threaded fastener passing through aligned corner portion apertures.

The improvement of the invention involves placing a thin flat spacer between the two corner portion bearing surfaces of each joint so as to slightly axially separate the bearing surfaces from one another. Tests show that this inclusion of a thin spacer in each frame-to-frame joint of a coupling surprisingly increases the coupling's performance. In prior design practice, this spacer insertion would have been considered detrimental to the geometry of forces within the joint, generating unwanted bending moments and stresses within the joints. It has been discovered, however, than when thin spacers are used, an unexpected and substantial increase in coupling performance capacity is gained. This gain is felt to be due to an improvement in the flexibility of the flex frame in the area of the interconnecting joint which results from changing the large rectangular clamped area to a smaller circular area. In effect, a greater length of each flexing element is free to bend and twist, resulting in a more even distribution of stresses in the vicinity of the transition between each end of a leg portion and its associated corner portion.

The general object of this invention is therefore to provide, in a flexible coupling of the type having a plurality of flex frames, an improved frame-to-frame connection whereby the performance of the coupling with regard to the range of angular and endwise misalignments it can handle under conditions of high power transmission is substantially increased.

Other objects and advantages of the invention will be apparent from the accompanying drawing and the following description describing a preferred embodiment of the invention.

SUMMARY OF THE INVENTION

This invention concerns a flexible coupling comprising a plurality of flex frames of rectangular or other quadrilateral shape each having four leg portions extending along the four sides of the frame and four associated corner portions. Two opposed corner portions of one end frame are connected to a driving member and two opposed corner portions of the other end frame are connected to a driven member. Among the frames themselves, each frame has two opposed corner portions connected to two opposed corner portions of the adjacent frame. The two connected corner portions of each joint have parallel bearing surfaces facing each other and these two bearing surfaces are axially separated from one another by a thin spacer preferably of annular shape and preferably made of a fretting resistant material such as molybdenum. Each joint further includes a threaded fastener passing through aligned openings in the two corner portions and in the interposed spacer, the threaded fastener having a head at one end and a threaded nut at the other for holding the parts together with the spacer tightly clamped between the two bearing surfaces of the two corner portions.

DETAILED DESCRIPTION OF THE PREFERRED EMBODIMENT

Figure 2:
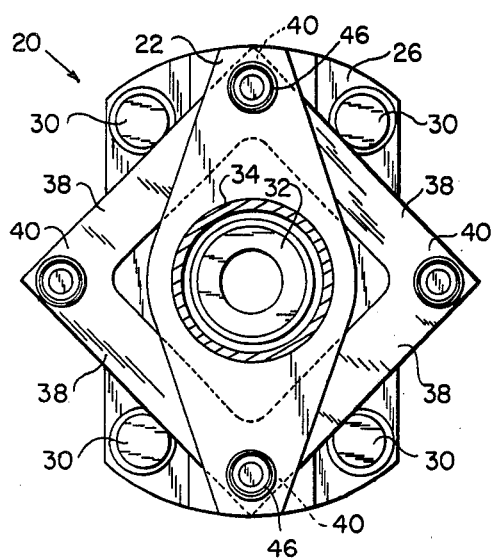
FIG. 2 is a left-hand end view of the coupling of FIG. 1.
Figure 1:
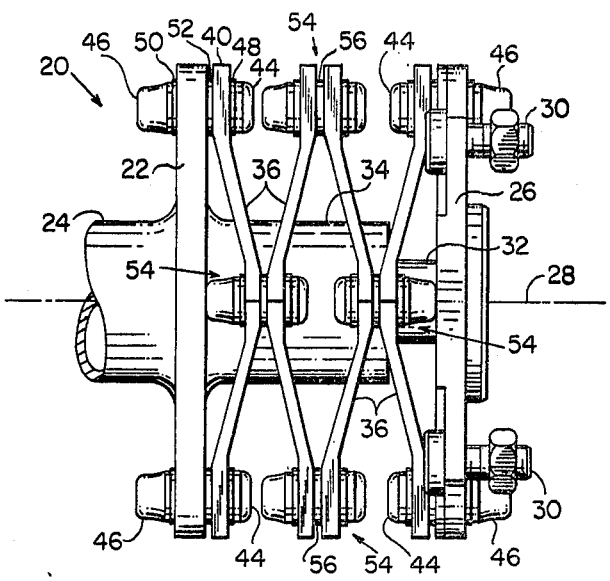
FIG. 1 is a side elevational view of a flexible coupling comprising the present invention.

Turning to the drawings, a coupling embodying the present invention is indicated generally at 20 in FIGS. 1 and 2. This coupling includes a driving member 22, in the form of a flange which extends radially in diametrically opposite directions from a driving shaft 24 to which it is nonrotatably fixed, and a driven member 26. The driven member 26 is in the form of a flat plate or flange generally parallel to and spaced from the driving member 22 along a central axis 28 about which the driving and driven parts 22 and 26 are rotatable. The driven part 26 includes four fasteners 30, 30 for fixing the driven part to a further driven component and it also includes a small diameter cylindrical axial extension 32 which fits into a tubular extension 34, of larger internal diameter, of the driving member 22. In regard to the extensions 32 and 34 the coupling 20 is similar to the coupling shown in FIG. 5 of U.S. Pat. No. 3,481,158 to which reference is made for further details. It will be understood however, that an annular elastomeric bushing, not shown, may be positioned between the tubular extension 34 and the smaller diameter extension 32 and that in the event of fracture of one of the leg portions of one of the flex frames, hereinafter described, the arrangement provides a fail safe feature whereby torque can be transmitted between the driving and driven members despite the fracture.

In FIG. 1 the coupling 20 is shown in a neutral condition at which the axes of the driving and driven elements 22 and 26 are both approximately colinear with the central axis 28 and are at a given axial displacement from one another. From this neutral condition, however, the driving and driven members may be inclined relative to one another to produce a condition known as angular misalignment and may also be shifted axially toward or away from one another to produce a condition known as endwise misalignment.

The angular and endwise misalignment of the driving and driven members 22 and 26 is accommodated by a plurality of flex members or frames 36, 36. The flex frames are arranged generally perpendicular to the central axis 28, are arranged next to one another along the axis 28 in a face-to-face fashion, and are connected to one another and to the driving and driven members so as to provide a path for torque transmission between the driving and driven members in either direction of rotation. The number of frames may vary from a minimum of two to any larger number, the illustrated coupling by way of example having four frames.

Figure 3:
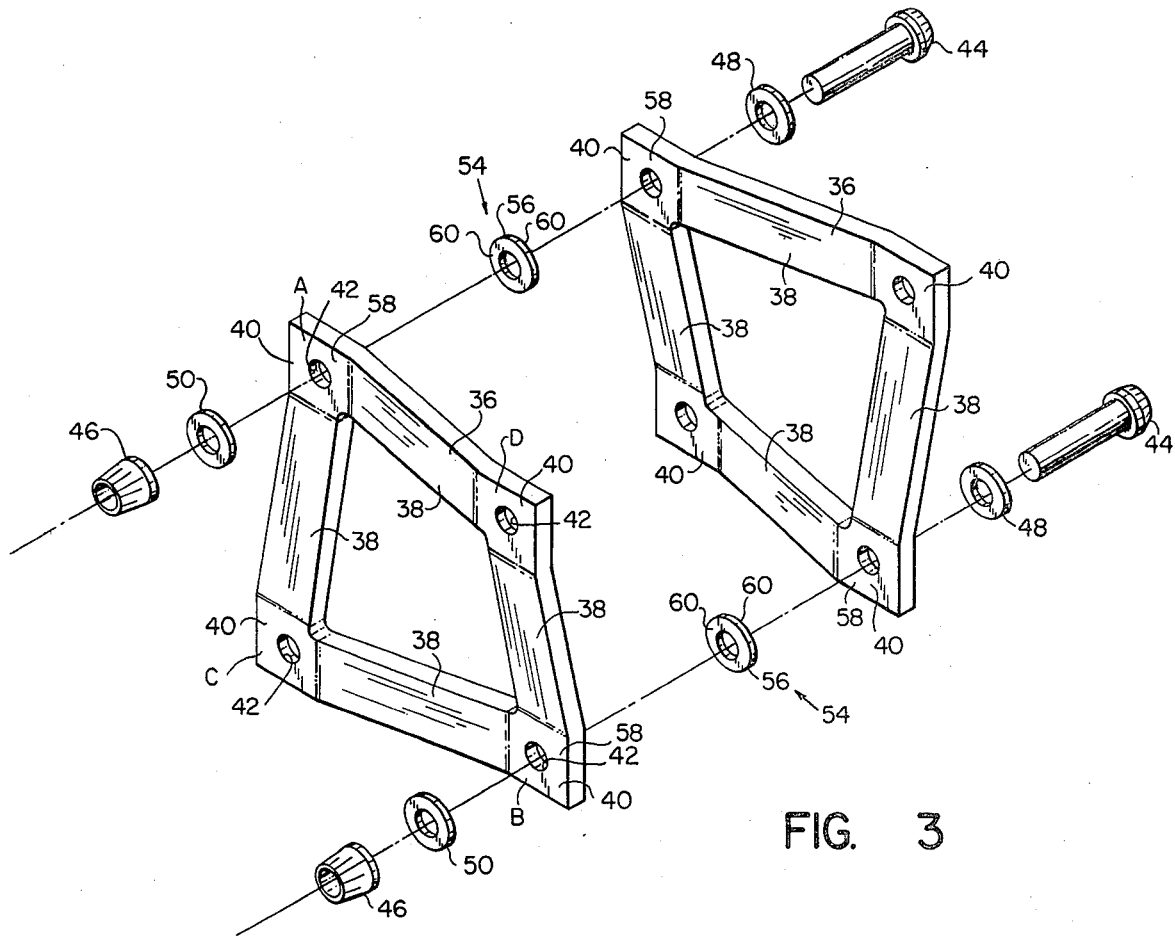
FIG. 3 is an exploded perspective view showing the construction of the two joints between two adjacent flex frames of the coupling of FIG. 1.

As shown best in FIG. 3 each flex frame 36 is of a basically quadrilateral form so as to include four leg portions 38, 38 and four corner portions 40, 40. Each corner portion 40 is located at the intersection of two adjacent leg portions and is integral with such leg portions. The flex frames are made of a resilient material, for example nitrided maraging steel, and may be made in various different ways as, for example, by cutting and bending them from sheet material or by machining them from solid blocks with appropriate subsequent heat treatment.

The frames 36 may also take various different shapes by preferably are either of generally oblong or square rectangular shape wherein the opposite leg portions 38, 38 of each frame are of equal length. Also, each frame may be flat, as in the couplings of U.S. Pat. No. 3,592,021, so that all four of its corner portions are in a common plane, or it may have inclined leg portions so that one opposed pair of its corner portions are in a first plane and the other opposed pair of its corner portions are in a second plane spaced axially from the first plane. In the illustrated coupling 20, each flex frame is of a square rectangular shape with inclined leg portions 38, 38. As shown in FIG. 3, for example, the left-hand flex frame 36 which is identical to the other three flex frames of the coupling, has two opposed corner portions A and B located in one plane and its other two corner portions C and D located in another plane spaced to the left of the plane containing the corner portions A and B. Also, each corner portion includes an aperture 42 for receiving a fastener used to fix the frame to either the driving member 22, the driven member 26, or to the next adjacent frame.

As mentioned, in the illustrated coupling 20 the connection between the driving member 22 and the driven member 26 includes four flex frames 36, 36. As seen best in FIG. 1, the left-hand end one of the frames is rigidly connected to the driving member 22 by two fasteners each consisting of a headed screw 44 and a nut 46. Between the head of the screw 44 and the associated corner portion 40 is a washer 48, between the nut 46 and the driving member 22 is another washer 50 and between the corner portion 40 and the driving member 22 is another washer 52. The right-hand end one of the flex frames is similarly connected to the driven member 26 by two fasteners each consisting of a screw 44 and nut 46 and a similar set of three washers arranged in the same manner.

Between the two end flex frames the frames are connected to one another with two opposed corners of each frame being connected to two opposed corners of the adjacent frame. A number of joints is accordingly provided with the ones of such joints shown in FIG. 1 being indicated generally at 54.

In accordance with the invention all of the frame-to-frame joints 54, 54 are of similar construction. Two of them are shown in exploded form in FIG. 3. As there shown each joint includes an apertured spacer 56 located between an associated pair of corner portions 40, 40. This spacer may take various different shapes but preferably is of the circular washer-type form shown. The two corner portions 40, 40 of each joint have bearing surfaces 58, 58 which face and are parallel to one another, and the spacer 56 has corresponding flat parallel faces 60, 60 which flatly engage the bearing surfaces 58, 58.

For illustrative purposes, the thickness of the spacers 56, 56 are exaggerated in FIGS. 1 and 3. Actually, these spacers may be made quite thin and preferably have a thickness dimension which is only slightly greater than necessary to prevent the two corner portions 40, 40 of a joint from touching one another due to bending and twisting of the flex frames under conditions of angular and endwise misalignment within the range of such misalignment for which said coupling is designed. For example, in a coupling wherein the flex frames are made of nitrided maraging steel and have a length on each side on the order of six inches and a leg and corner portion thickness on the order of $\frac{1}{8}$ inch, the spacers may have a thickness on the order of 0.010 inch.

As also shown in FIG. 3 each joint 54 also includes a threaded fastener 44 having a shank which passes through the apertures in the corner portions 40, 40 and in the spacer 56 and which receives a nut 46 with a washer 48 being located between the head of the fastener 44 and one of the corner portions 40 and another washer 50 being located between the other portion 40 and the nut 46. In the finished assembly the nut 46 is tightly threaded onto the screw 44 to hold the parts of the joint in fixed and tightly clamped relationship to one another between the head of the screw 44 and the nut 46.

The spacers 56, 56 in the joints 54, 54 have been found to surprisingly and unexpectedly increase the performance of the coupling as compared to a coupling which is otherwise the same except for not having such spacers. When the spacers are not present the two corner portions 40, 40 of each joint flatly engage one another and as the coupling is operated under conditions of angular and endwise misalignment the coengaging bearing surfaces tend to cycylically open and close in phase with the coupling's rotation. This opening and closing of the bearing surfaces varies the effective flexing length of the leg portions 38, 38. The placement of a spacer 56 in each joint establishes a fixed non-varying flexing length for each leg portion and also tends to make each leg portion effectively longer than it would otherwise be so as to increase the flexibility of the leg portion. It is believed that this as well as the fact that the spacers cause more even distribution of stresses in the transitions between each leg portion 38 and its associated corner portions 40, 40 is at least part of the reason for obtaining the improved performance. Also, when two corner portions 40, 40 engage one another without an intervening spacer a condition is had where two similar metals bear against one another, and fretting of the bearing surfaces is likely to occur due to microscopic relative motion between them. Each spacer 56 is therefore also preferably made of a material dissimilar from that of the flex frames, and is preferably made of a fretting resistant material such as molybdenum, so as to also reduce the likelihood of damage or failure due to fretting of the bearing surfaces.

I claim:

1. A flexible coupling for transmitting rotary motion between a driving member and a driven member, said coupling comprising a plurality of quadrilateral flex frames each of which flex frames has four leg portions respectively extending along the four sides of the frame and four corner portions, each of said four corner portions being located at the intersection of an adjacent two of said leg portions and being integrally connected to said adjacent two of said leg portions, first attachment means for connecting two diagonally opposed corner portions of one of said flex frames to said driving member, second attachment means for connecting two diagonally opposed corner portions of a second of said flex frames to said driven member, and third attachment means for connecting the other two diagonally opposed corner portions of said one flex frame to the other two diagonally opposed corner portions of said second flex frame so that each joint has associated with it four of said leg portions two of which extend away from said joint in one direction generally tangentially of said coupling and the other two of which extend away from said joint in an opposite generally tangential direction, said third attachment means including a plurality of joints each joining a pair of said corner portions, said two corner portions of each joint being located adjacent to one another and being from adjacent ones of said flex frames, said two corner portions of each joint further having flat bearing surfaces facing and parallel to one another and also having aligned apertures, each of said joints including an apertured spacer located between said two bearing surfaces of said associated pair of corner portions which spacer has parallel bearing faces engageable respectively with said two bearing surfaces, and each of said joints including a fastener with a shank passing through said apertures of said associated pair of corner portions and the aperture of said spacer for tightly holding said bearing surfaces of said corner portions in engagement with the bearing faces of said spacer.

2. A flexible coupling as defined in claim 1 further characterized by said spacer being an annular washer.

3. A flexible coupling as defined in claim 1 or claim 2 further characterized by said spacer being made of a fretting resistant material.

4. A flexible coupling as defined in claim 1 or claim 2 further characterized by said spacer being made of molybdenum.

5. A flexible coupling as defined in claim 1 or claim 2 for use in an application having a given possible maximum amount of angular misalignment and a given possible maximum amount of endwise misalignment, further characterized by each of said spacers having a thickness which is of such dimension as to be appreciably no more than that necessary to keep said corner portion bearing surfaces of the associated joint from touching one another during operation of said coupling under any condition of angular and endwise misalignment within said maximum amounts.

6. A flexible coupling for transmitting rotary motion between a driving and a driven member spaced from one another along a central axis, said coupling comprising a plurality of flex frames of generally quadrilateral shape each having four leg portions extending along the four sides of the frame and four associated corner portions, said flex frames being located between said driving and driven members and being positioned face-to-face along said central axis, means connecting two opposed corner portions of an end one of said frames to said driving member, means connecting two opposed corner portions of the other end one of said frames to said driven member, and means for connecting said frames to one another by connecting two opposed corner portions of each of said frames to two opposed corner portions of the next adjacent frame, said means for connecting said frames to one another providing a plurality of joints at each of which two corner portions of adjacent frames are connected to one another so that each joint has associated with it four of said leg portions two of which extend away from said joint in one direction generally tangentially of said coupling and the other two of which extend away from said joint in an opposite generally tangential direction, the two connected corner portions of each of said joints having parallel bearing surfaces facing each other, each of said joints including a spacer interposed between the associated two bearing surfaces and having flat faces respectively engaging said bearing surfaces, and each of said joints further including a fastener passing through aligned openings in the two corner portions of the joint and in the interposed spacer for holding the parts together with the spacer tightly clamped between the two bearing surfaces of the two corner portions.

7. A flexible coupling as defined in claim 6 further characterized by said spacer being an annular washer.

8. A flexible coupling as defined in claim 6 further characterized by said spacer being made of a fretting resistant material.

9. A flexible coupling as defined in claim 6 further characterized by said spacer being made of molybdenum.

10. A flexible coupling as defined in claim 6 further characterized by each of said flex frames being of such a shape that one opposed pair of its corner portions are located in a first plane generally perpendicular to said central axis and the other pair of its opposed corner portions are located in a second plane generally perpendicular to said central axis which first and second planes are spaced axially from one another along said central axis and that each of said leg portions of the frame are inclined with respect to a plane perpendicular to said central axis.

11. A flexible coupling as defined in claim 10 further characterized by each of said bearing surfaces of each of said corner portions of said flex member being located in a plane generally perpendicular to said central axis.

12. A flexible coupling as defined in claim 6 further characterized by each of said flex frames being of a rectangular shape.

13. A flexible coupling as defined in claim 6 further characterized by each of said leg portions of each of said flex frames being leaf shaped.

14. A flexible coupling as defined in claim 6 further characterized by each of said leg portions of each of said flex frames having a generally rectangular cross-sectional shape.

15. A flexible coupling as defined in claim 1 further characterized by said corner portions and said leg portions of each of said flex frames all being of the same thickness.

16. A flexible coupling as defined in claim 6 further characterized by said corner portions and said leg portions of each of said flex frames all being of said the same thickness.

17. A flexible coupling as defined in claim 16 further characterized by each of said flat faces of each of said spacers being of substantially smaller area than the area of the one of said bearing surfaces of the flex frame corner portion which it engages.

* * * * *